United States Patent
Shi et al.

(10) Patent No.: US 10,175,414 B2
(45) Date of Patent: Jan. 8, 2019

(54) CHANNEL CUT BACKLIGHT FOR LIQUID CRYSTAL DISPLAY

(71) Applicant: Facebook Technologies, LLC, Menlo Park, CA (US)

(72) Inventors: Jianru Shi, Union City, CA (US); Evan M. Richards, Santa Clara, CA (US)

(73) Assignee: Facebook Technologies, LLC, Menlo Park, CA (US)

(*) Notice: Subject to any disclaimer, the term of this patent is extended or adjusted under 35 U.S.C. 154(b) by 0 days.

(21) Appl. No.: 15/403,928

(22) Filed: Jan. 11, 2017

(65) Prior Publication Data

US 2018/0196185 A1 Jul. 12, 2018

(51) Int. Cl.
 F21V 8/00 (2006.01)

(52) U.S. Cl.
 CPC ......... *G02B 6/0038* (2013.01); *G02B 6/0068* (2013.01); *G02B 6/0073* (2013.01)

(58) Field of Classification Search
 None
 See application file for complete search history.

(56) References Cited

U.S. PATENT DOCUMENTS

| | | | |
|---|---|---|---|
| 2007/0069210 A1* | 3/2007 | Yamazaki | G02F 1/13458 257/59 |
| 2011/0227895 A1* | 9/2011 | Takahashi | G02B 6/0061 345/211 |
| 2012/0120680 A1* | 5/2012 | Fang | G02B 6/0036 362/609 |
| 2013/0070004 A1* | 3/2013 | Inoue | G09G 3/003 345/690 |
| 2013/0077020 A1* | 3/2013 | Rohrmoser | G09F 13/04 349/62 |
| 2013/0148056 A1* | 6/2013 | Hineno | G02F 1/133524 349/62 |
| 2017/0004778 A1* | 1/2017 | Kang | H05B 33/0827 |

* cited by examiner

Primary Examiner — Ryan Crockett
(74) Attorney, Agent, or Firm — Fenwick & West LLP

(57) ABSTRACT

A liquid crystal display (LCD) device a LCD panel and a segmented backlight for illuminating the LCD panel. The backlight includes a light guide having an array of light channels. The array of light channels is defined by an array of notches on the bottom surface of the light guide. Light emitting diodes (LEDs) are disposed along the side surface of the light guide to emit light in a first direction into the array of light channels of the light guide. The array of light channels receives the light from the LEDs and directs the light in a second direction from the top surface of the light guide toward the LCD panel. One or more LEDs may selectively emit light into each light channel. The notches defined between light channels controls light leakage across adjacent light channels.

19 Claims, 10 Drawing Sheets

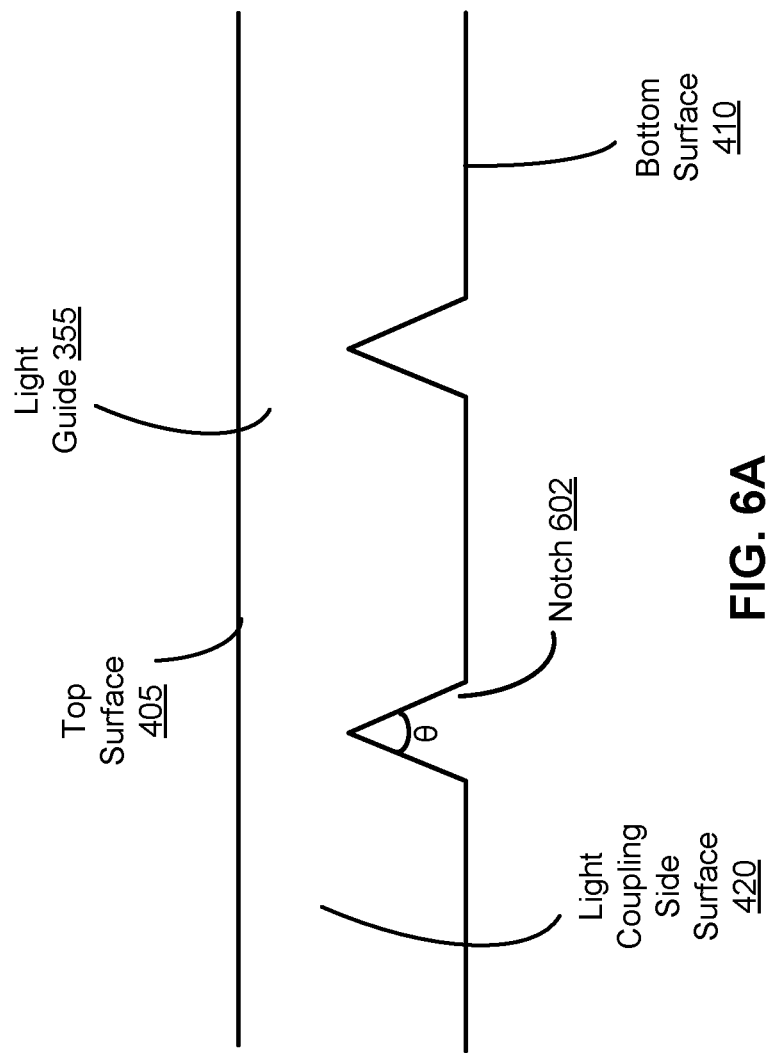

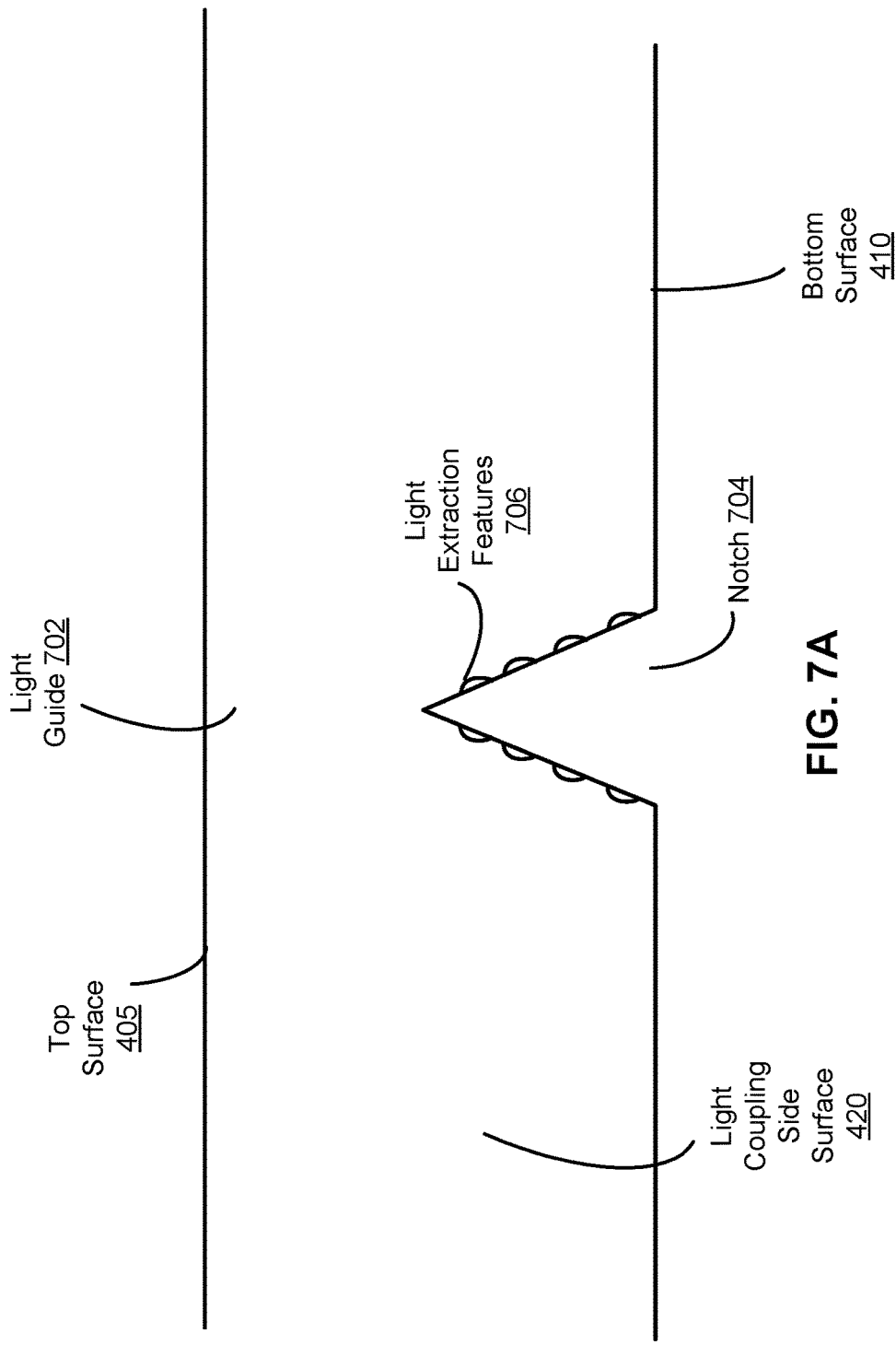

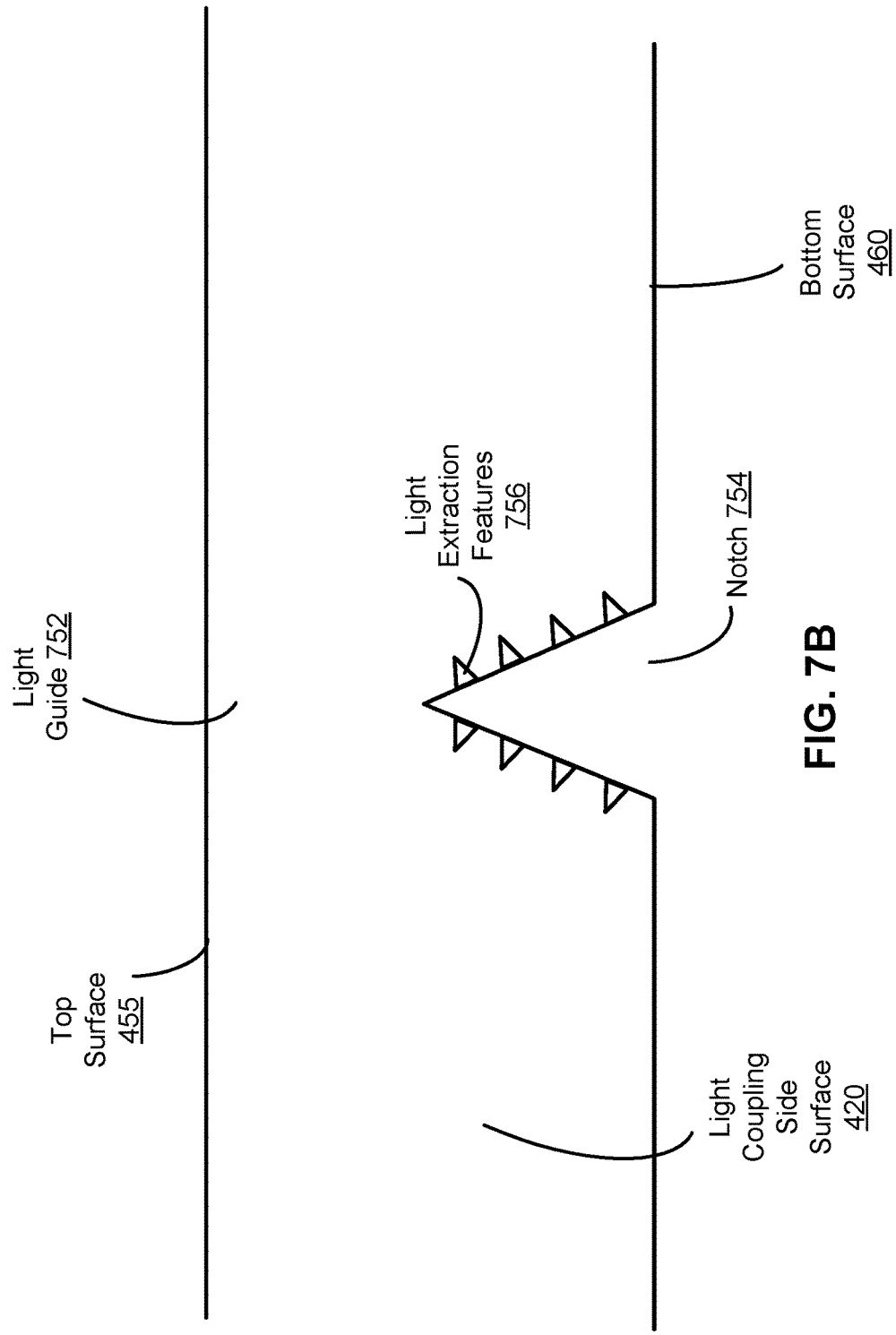

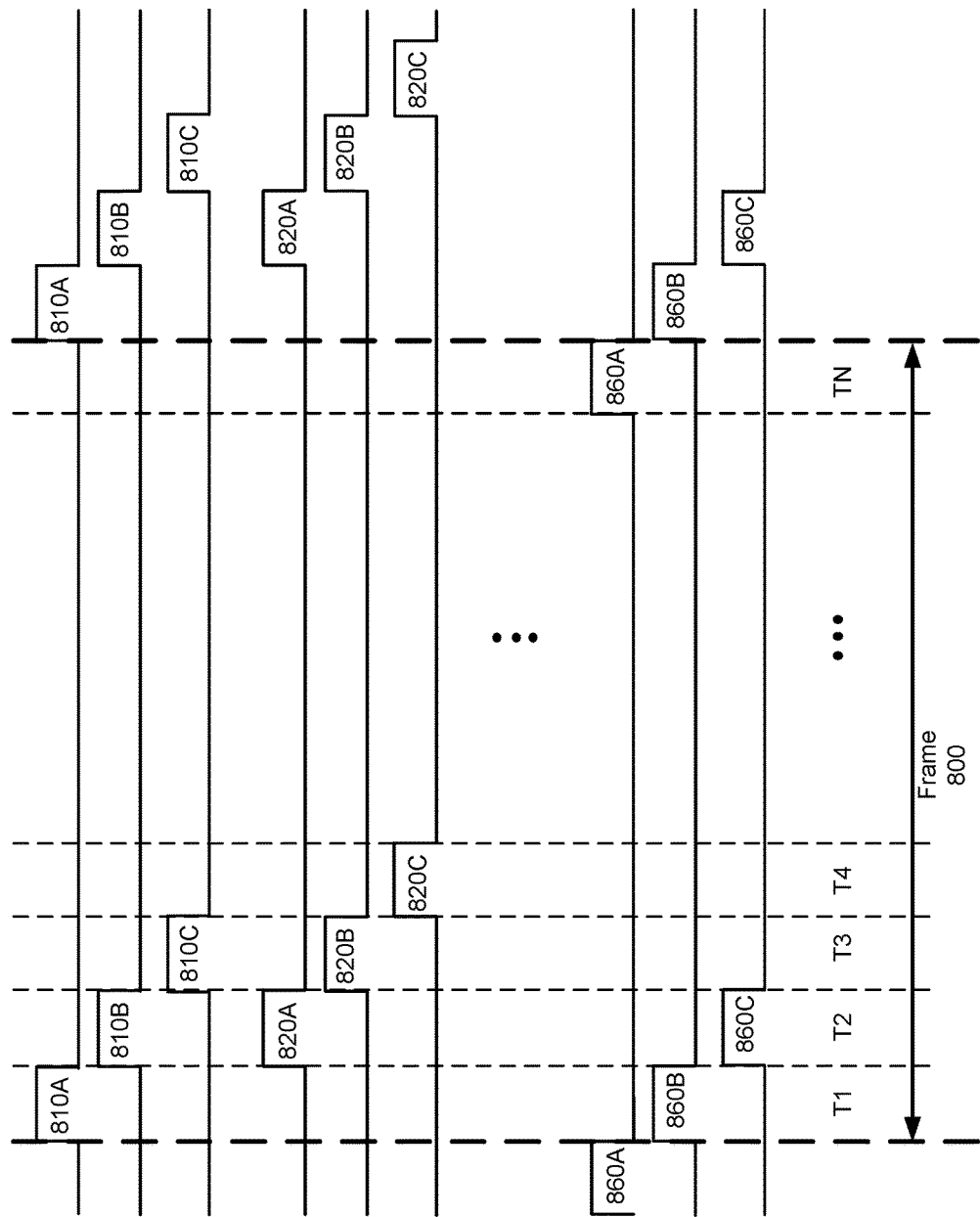

CHANNEL CUT BACKLIGHT FOR LIQUID CRYSTAL DISPLAY

BACKGROUND

Backlights are disposed behind liquid crystal display (LCD) panels to illuminate the pixels of the LCD panel. A segmented backlight allows for selective activation of different portions of the backlight, and thus provides for illumination of different portions of the LCD panel. The segmented backlight includes boundaries between backlight portions that prevent light propagation across backlight portions, resulting in dark lines being formed on the LCD panel when the segmented backlight illuminates the LCD Panel.

SUMMARY

A liquid crystal display (LCD) device includes a backlight with a channel cut light guide. The backlight (also referred to herein as a "channel cut backlight" based on including the channel cut light guide) is disposed behind the LCD and provides illumination to the pixels of the LCD panel. The backlight is a segmented in the sense that individual portions of the backlight can be separately illuminated, thereby providing selective illumination for different portions of the LCD panel. The channel cut light guide (also referred to herein as "light guide") includes an array of light channels defined by an array of notches on the bottom surface of the light guide. The backlight includes an array of lighting sources (e.g., light emitting diodes (LEDs)) that can be separately switched on or off, with different light sources emitting light into different light channels. As the light emitted into the light channel propagates along the width of the light guide, the light is substantially confined within the light channel with minimal leakage to adjacent light channels, and is directed from the top surface of the light guide to a portion of the LCD panel. To improve the smoothness of boundary transitions for segmented backlights and prevent the formation of dark lines at the boundary transitions, the light channel permits some leakage of light into the adjacent light channels, but confines the leakage to the adjacent light channels to provide selective segmentation.

Some embodiments may include a head-mounted display including the LCD device having the channel cut light guide. Some embodiments may include a backlight including the channel cut light guide.

BRIEF DESCRIPTION OF THE DRAWINGS

FIGS. 6A and 6B show examples of channel cut light guides, in accordance with some embodiments.

FIGS. 7A and 7B show channel cut light guides including extraction features, in accordance with some embodiments.

FIG. 8 is a timing diagram of signals applied to an electronic display, in accordance with some embodiments.

Figure 1:
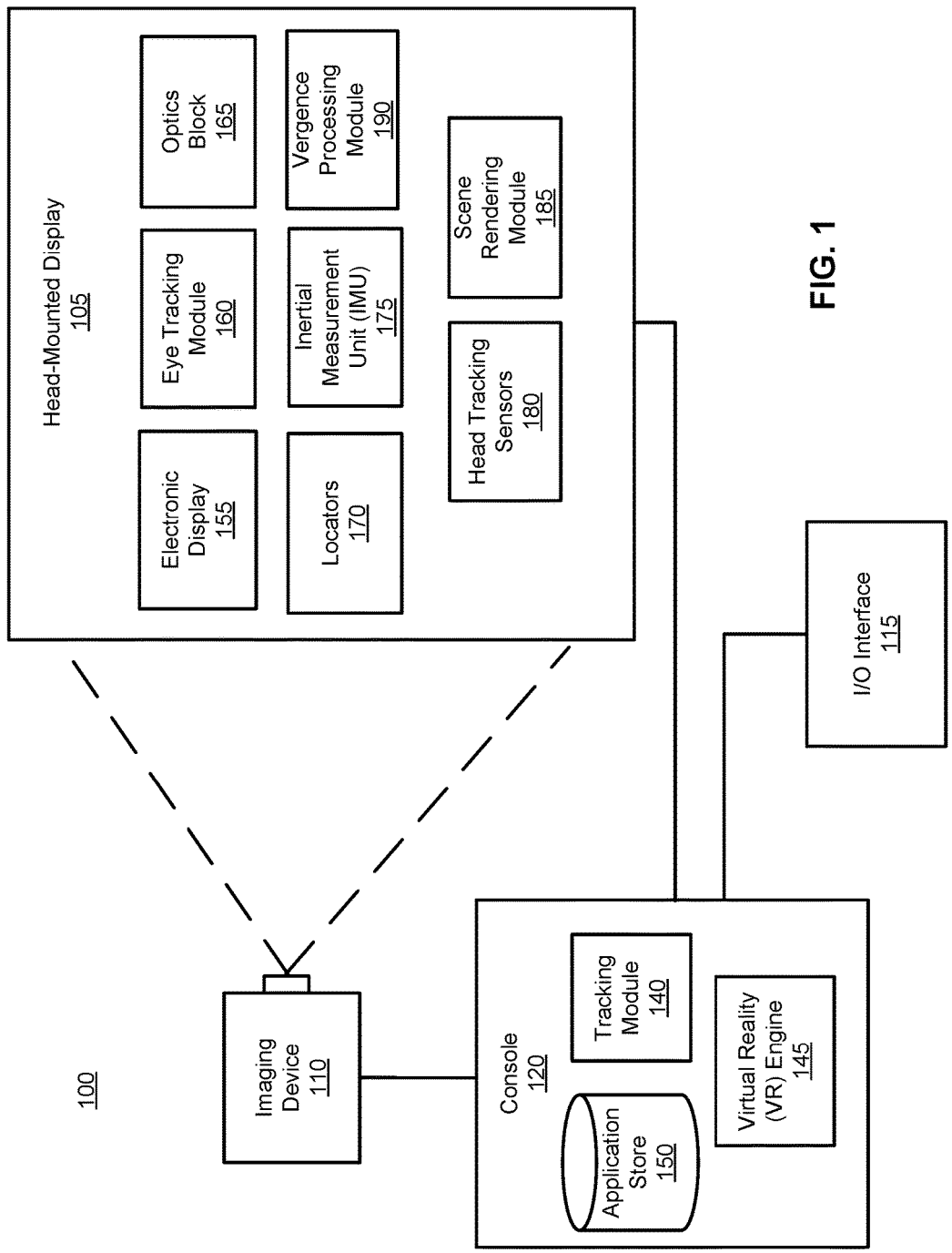
FIG. 1 shows a system, in accordance with some embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Configuration Overview

Example embodiments of disclosed configurations include a liquid crystal display (LCD) panel with a backlight including a channel cut light guide. The backlight is disposed behind the LCD and provides illumination to the pixels of the LCD panel. The channel cut light guide includes light channels defined by an array of notches on the bottom surface of the light guide. An array of light sources, such as light emitting diodes (LEDs), emit light into the light guide, with different light sources emitting light into different light channels. A controller drives the activation and deactivation of the LEDs, where different LEDs can be activated at different times to provide a segmented backlight. The segmented backlight selectively illuminates different portions of the LCD panel at different times. A selected light channel can be turned on to illuminate light, while other light channels are turned off. Advantageously, light emitted into a light channel is substantially confined within the light channel, with small amounts of light leakage into adjacent light channels. The light leakage between adjacent light channels provides for smoother boundary transitions between illuminated and non-illuminated portions of the light guide and reduces the occurrence of dark lines at the boundary transitions, and thus smoother boundaries between illuminated and non-illuminated LCD panel portions operated with segmented backlights.

In some embodiments, (i) programming and transitioning of a state of a liquid crystal in a portion of a liquid crystal layer and (ii) illuminating a light channel of the backlight corresponding to the portion of the liquid crystal layer can occur in an alternating sequence. Specifically, a first portion of the liquid crystal layer can be programmed and a state of a liquid crystal in the first portion of the liquid crystal layer can be transitioned according to the programming during a first time period. During a second time period after the first time period, a first light channel corresponding to the first portion of the liquid crystal layer can be illuminated. The first light channel allows for some leakage of light to adjacent light channels, and thus the first portion of the liquid crystal layer programmed in the first time period includes pixels illuminated by the first light channel, at least a portion of pixels illuminated by the adjacent light channels. Also during the second time period, a second portion of the liquid crystal layer can be programmed and a state of a liquid crystal in the second portion of the liquid crystal layer can be transitioned according to the programming, and so forth. As a result, latency involved for programming a portion of the liquid crystal layer and illuminating light can be reduced while maintaining smooth boundary transitions for a segmented backlight.

Programming a liquid crystal herein refer to applying electric signals (e.g., voltage or current) to cause the liquid crystal to be placed in a desired state according to the image data to be displayed on the LCD panel.

System Overview

FIG. 1 shows a system 100 including a head-mounted display (HMD). The system 100 may be for use as a virtual reality (VR) system, an augmented reality (AR) system, a mixed reality (MR) system, or some combination thereof. In this example, the system 100 includes a HMD 105, an imaging device 110, and an input/output (I/O) interface 115, which are each coupled to a console 120. While FIG. 1 shows a single HMD 105, a single imaging device 110, and an I/O interface 115, in other embodiments, any number of these components may be included in the system. For example, there may be multiple HMDs 105 each having an associated input interface 115 and being monitored by one or more imaging devices 110, with each HMD 105, I/O interface 115, and imaging devices 110 communicating with the console 120. In alternative configurations, different and/or additional components may also be included in the system 100. The HMD 105 may act as a VR, AR, and/or a MR HMD. An MR and/or AR HMD augments views of a physical, real-world environment with computer-generated elements (e.g., images, video, sound, etc.).

The HMD 105 presents content to a user. Example content includes images, video, audio, or some combination thereof. Audio content may be presented via a separate device (e.g., speakers and/or headphones) external to the HMD 105 that receives audio information from the HMD 105, the console 120, or both. The HMD 105 includes an electronic display 155, an eye tracking module 160, an optics block 165, one or more locators 170, an internal measurement unit (IMU) 175, head tracking sensors 180, and a scene rendering module 185, and a vergence processing module 190.

The electronic display 155 includes an LCD device including a LCD panel and a backlight. As discussed in greater detail below, the backlight includes a channel cut light guide that reduces the appearance of dark lines and noticeable transitions between different portions of the light guide defined by light channels.

The optics block 165 adjusts its focal length responsive to instructions from the console 120. In some embodiments, the optics block 165 includes a multi multifocal block to adjust a focal length (adjusts optical power) of the optics block 165

The eye tracking module 160 tracks an eye position and eye movement of a user of the HMD 105. A camera or other optical sensor inside the HMD 105 captures image information of a user's eyes, and the eye tracking module 160 uses the captured information to determine interpupillary distance, interocular distance, a three-dimensional (3D) position of each eye relative to the HMD 105 (e.g., for distortion adjustment purposes), including a magnitude of torsion and rotation (i.e., roll, pitch, and yaw) and gaze directions for each eye. The information for the position and orientation of the user's eyes is used to determine the gaze point in a virtual scene presented by the HMD 105 where the user is looking.

The vergence processing module 190 determines a vergence depth of a user's gaze based on the gaze point or an estimated intersection of the gaze lines determined by the eye tracking module 160. Vergence is the simultaneous movement or rotation of both eyes in opposite directions to maintain single binocular vision, which is naturally and automatically performed by the human eye. Thus, a location where a user's eyes are verged is where the user is looking and is also typically the location where the user's eyes are focused. For example, the vergence processing module 190 triangulates the gaze lines to estimate a distance or depth from the user associated with intersection of the gaze lines. The depth associated with intersection of the gaze lines can then be used as an approximation for the accommodation distance, which identifies a distance from the user where the user's eyes are directed. Thus, the vergence distance allows determination of a location where the user's eyes should be focused.

The locators 170 are objects located in specific positions on the HMD 105 relative to one another and relative to a specific reference point on the HMD 105. A locator 170 may be a light emitting diode (LED), a corner cube reflector, a reflective marker, a type of light source that contrasts with an environment in which the HMD 805 operates, or some combination thereof. Active locators 170 (i.e., an LED or other type of light emitting device) may emit light in the visible band (~380 nm to 850 nm), in the infrared (IR) band (~850 nm to 1 mm), in the ultraviolet band (10 nm to 380 nm), some other portion of the electromagnetic spectrum, or some combination thereof.

The locators 170 can be located beneath an outer surface of the HMD 105, which is transparent to the wavelengths of light emitted or reflected by the locators 170 or is thin enough not to substantially attenuate the wavelengths of light emitted or reflected by the locators 170. Further, the outer surface or other portions of the HMD 105 can be opaque in the visible band of wavelengths of light. Thus, the locators 170 may emit light in the IR band while under an outer surface of the HMD 105 that is transparent in the IR band but opaque in the visible band.

The IMU 175 is an electronic device that generates fast calibration data based on measurement signals received from one or more of the head tracking sensors 180, which generate one or more measurement signals in response to motion of HMD 105. Examples of the head tracking sensors 180 include accelerometers, gyroscopes, magnetometers, other sensors suitable for detecting motion, correcting error associated with the IMU 175, or some combination thereof. The head tracking sensors 180 may be located external to the IMU 175, internal to the IMU 175, or some combination thereof.

Based on the measurement signals from the head tracking sensors 180, the IMU 175 generates fast calibration data indicating an estimated position of the HMD 105 relative to an initial position of the HMD 105. For example, the head tracking sensors 180 include multiple accelerometers to measure translational motion (forward/back, up/down, left/right) and multiple gyroscopes to measure rotational motion (e.g., pitch, yaw, and roll). The IMU 175 can, for example, rapidly sample the measurement signals and calculate the estimated position of the HMD 105 from the sampled data. For example, the IMU 175 integrates measurement signals received from the accelerometers over time to estimate a velocity vector and integrates the velocity vector over time to determine an estimated position of a reference point on the HMD 105. The reference point is a point that may be used to describe the position of the HMD 105. While the reference point may generally be defined as a point in space, in various embodiments, a reference point is defined as a point within the HMD 105 (e.g., a center of the IMU 175). Alternatively, the IMU 175 provides the sampled measurement signals to the console 120, which determines the fast calibration data.

The IMU 175 can additionally receive one or more calibration parameters from the console 120. As further discussed below, the one or more calibration parameters are used to maintain tracking of the HMD 105. Based on a received calibration parameter, the IMU 175 may adjust one or more of the IMU parameters (e.g., sample rate). In some embodiments, certain calibration parameters cause the IMU 175 to update an initial position of the reference point to correspond to a next calibrated position of the reference point. Updating the initial position of the reference point as the next calibrated position of the reference point helps reduce accumulated error associated with determining the estimated position. The accumulated error, also referred to as drift error, causes the estimated position of the reference point to "drift" away from the actual position of the reference point over time.

The scene rendering module 185 receives content for the virtual scene from a VR engine 145 and provides the content for display on the electronic display 155. Additionally, the scene rendering module 185 can adjust the content based on information from the IMU 175, the vergence processing module 830, and the head tracking sensors 180. The scene rendering module 185 determines a portion of the content to be displayed on the electronic display 155 based on one or more of the tracking module 140, the head tracking sensors 180, or the IMU 175.

The imaging device 110 generates slow calibration data in accordance with calibration parameters received from the console 120. Slow calibration data includes one or more images showing observed positions of the locators 125 that are detectable by imaging device 110. The imaging device 110 may include one or more cameras, one or more video cameras, other devices capable of capturing images including one or more locators 170, or some combination thereof. Additionally, the imaging device 110 may include one or more filters (e.g., for increasing signal to noise ratio). The imaging device 110 is configured to detect light emitted or reflected from the locators 170 in a field of view of the imaging device 110. In embodiments where the locators 170 include passive elements (e.g., a retroreflector), the imaging device 110 may include a light source that illuminates some or all of the locators 170, which retro-reflect the light towards the light source in the imaging device 110. Slow calibration data is communicated from the imaging device 110 to the console 120, and the imaging device 110 receives one or more calibration parameters from the console 120 to adjust one or more imaging parameters (e.g., focal length, focus, frame rate, ISO, sensor temperature, shutter speed, aperture, etc.).

The I/O interface 115 is a device that allows a user to send action requests to the console 120. An action request is a request to perform a particular action. For example, an action request may be to start or end an application or to perform a particular action within the application. The I/O interface 115 may include one or more input devices. Example input devices include a keyboard, a mouse, a hand-held controller, a glove controller, or any other suitable device for receiving action requests and communicating the received action requests to the console 120. An action request received by the I/O interface 115 is communicated to the console 120, which performs an action corresponding to the action request. In some embodiments, the I/O interface 115 may provide haptic feedback to the user in accordance with instructions received from the console 120. For example, haptic feedback is provided by the I/O interface 115 when an action request is received, or the console 120 communicates instructions to the I/O interface 115 causing the I/O interface 115 to generate haptic feedback when the console 120 performs an action.

The console 120 provides content to the HMD 105 for presentation to the user in accordance with information received from the imaging device 110, the HMD 105, or the I/O interface 115. The console 120 includes an application store 150, a tracking module 140, and the VR engine 145. Some embodiments of the console 120 have different or additional modules than those described in conjunction with FIG. 1. Similarly, the functions further described below may be distributed among components of the console 120 in a different manner than is described here.

The application store 150 stores one or more applications for execution by the console 120. An application is a group of instructions, that when executed by a processor, generates content for presentation to the user. Content generated by an application may be in response to inputs received from the user via movement of the HMD 105 or the I/O interface 115. Examples of applications include gaming applications, conferencing applications, video playback application, or other suitable applications.

The tracking module 140 calibrates the system 100 using one or more calibration parameters and may adjust one or more calibration parameters to reduce error in determining position of the HMD 105. For example, the tracking module 140 adjusts the focus of the imaging device 110 to obtain a more accurate position for observed locators 170 on the HMD 105. Moreover, calibration performed by the tracking module 140 also accounts for information received from the IMU 175. Additionally, if tracking of the HMD 105 is lost (e.g., imaging device 110 loses line of sight of at least a threshold number of locators 170), the tracking module 140 re-calibrates some or all of the system 100 components.

Additionally, the tracking module 140 tracks the movement of the HMD 105 using slow calibration information from the imaging device 110 and determines positions of a reference point on the HMD 105 using observed locators from the slow calibration information and a model of the HMD 105. The tracking module 140 also determines positions of the reference point on the HMD 105 using position information from the fast calibration information from the IMU 175 on the HMD 105. Additionally, the tracking module 160 may use portions of the fast calibration information, the slow calibration information, or some combination thereof, to predict a future location of the HMD 105, which is provided to the VR engine 145.

The VR engine 145 executes applications within the system 100 and receives position information, acceleration information, velocity information, predicted future positions, or some combination thereof for the HMD 105 from the tracking module 140. Based on the received information, the VR engine 145 determines content to provide to the HMD 105 for presentation to the user, such as a virtual scene, one or more virtual objects to overlay onto a real world scene, etc.

In some embodiments, the VR engine 145 maintains focal capability information of the optics block 165. Focal capability information is information that describes what focal distances are available to the optics block 165. Focal capability information may include, e.g., a range of focus the optics block 165 is able to accommodate (e.g., 0 to 4 diopters), a resolution of focus (e.g., 0.25 diopters), a number of focal planes, combinations of settings for switchable half wave plates (SHWPs) (e.g., active or non-active) that map to particular focal planes, combinations of settings for SHWPS and active liquid crystal lenses that map to particular focal planes, or some combination thereof.

The VR engine 145 generates instructions for the optics block 165, the instructions causing the optics block 165 to adjust its focal distance to a particular location. The VR engine 145 generates the instructions based on focal capability information and, e.g., information from the vergence processing module 190, the IMU 175, and the head tracking sensors 180. The VR engine 145 uses the information from the vergence processing module 190, the IMU 175, and the head tracking sensors 180, or some combination thereof, to select an ideal focal plane to present content to the user. The VR engine 145 then uses the focal capability information to select a focal plane that is closest to the ideal focal plane. The VR engine 145 uses the focal information to determine settings for one or more SHWPs, one or more active liquid crystal lenses, or some combination thereof, within the optics block 176 that are associated with the selected focal plane. The VR engine 145 generates instructions based on the determined settings, and provides the instructions to the optics block 165.

The VR engine 145 performs an action within an application executing on the console 120 in response to an action request received from the I/O interface 115 and provides feedback to the user that the action was performed. The provided feedback may be visual or audible feedback via the HMD 105 or haptic feedback via the I/O interface 115.

Figure 2A:
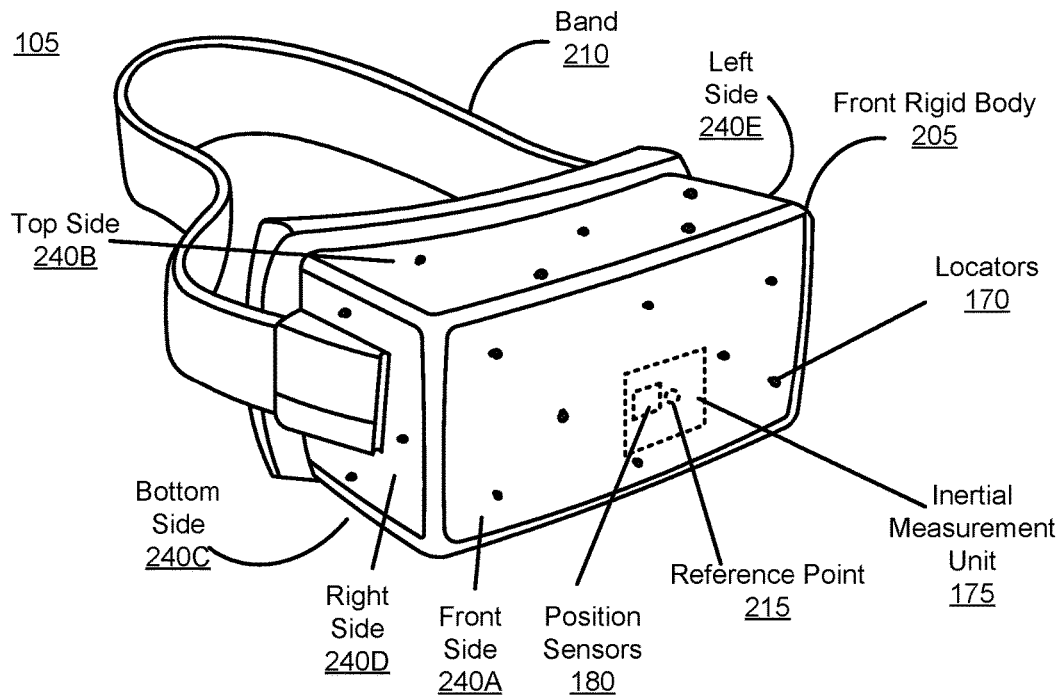
FIG. 2A shows a head-mounted display (HMD), in accordance with some embodiments.

FIG. 2A shows a head-mounted display (HMD) 105, in accordance with some embodiments. The HMD 105 includes a front rigid body 205 and a band 210. The front rigid body 205 includes an electronic display (not shown), an inertial measurement unit (IMU) 175, one or more position sensors 180, and locators 170. In some embodiments, a user movement is detected by use of the inertial measurement unit 175, position sensors 180, and/or the locators 170, and an image is presented to a user through the electronic display according to the user movement detected. In some embodiments, the HMD 105 can be used for presenting a virtual reality, an augmented reality, or a mixed reality to a user.

A position sensor 180 generates one or more measurement signals in response to motion of the HMD 105. Examples of position sensors 180 include: one or more accelerometers, one or more gyroscopes, one or more magnetometers, another suitable type of sensor that detects motion, a type of sensor used for error correction of the IMU 175, or some combination thereof. The position sensors 180 may be located external to the IMU 175, internal to the IMU 175, or some combination thereof. In FIG. 2A, the position sensors 180 are located within the IMU 175, and neither the IMU 175 nor the position sensors 180 are visible to the user.

Based on the one or more measurement signals from one or more position sensors 180, the IMU 175 generates calibration data indicating an estimated position of the HMD 105 relative to an initial position of the HMD 105. In some embodiments, the IMU 175 rapidly samples the measurement signals and calculates the estimated position of the HMD 100 from the sampled data. For example, the IMU 175 integrates the measurement signals received from the accelerometers over time to estimate a velocity vector and integrates the velocity vector over time to determine an estimated position of a reference point on the HMD 105. Alternatively, the IMU 17 provides the sampled measurement signals to a console (e.g., a computer), which determines the calibration data. The reference point is a point that may be used to describe the position of the HMD 105. While the reference point may generally be defined as a point in space; however, in practice the reference point is defined as a point within the HMD 105 (e.g., a center of the IMU 175).

The locators 180 are located in fixed positions on the front rigid body 205 relative to one another and relative to a reference point 215. In FIG. 2A, the reference point 215 is located at the center of the IMU 175. Each of the locators 170 emits light that is detectable by an imaging device (e.g., camera or an image sensor). Locators 170, or portions of locators 170, are located on a front side 240A, a top side 240B, a bottom side 240C, a right side 240D, and a left side 240E of the front rigid body 205 in the example of FIG. 2A.

Figure 2B:
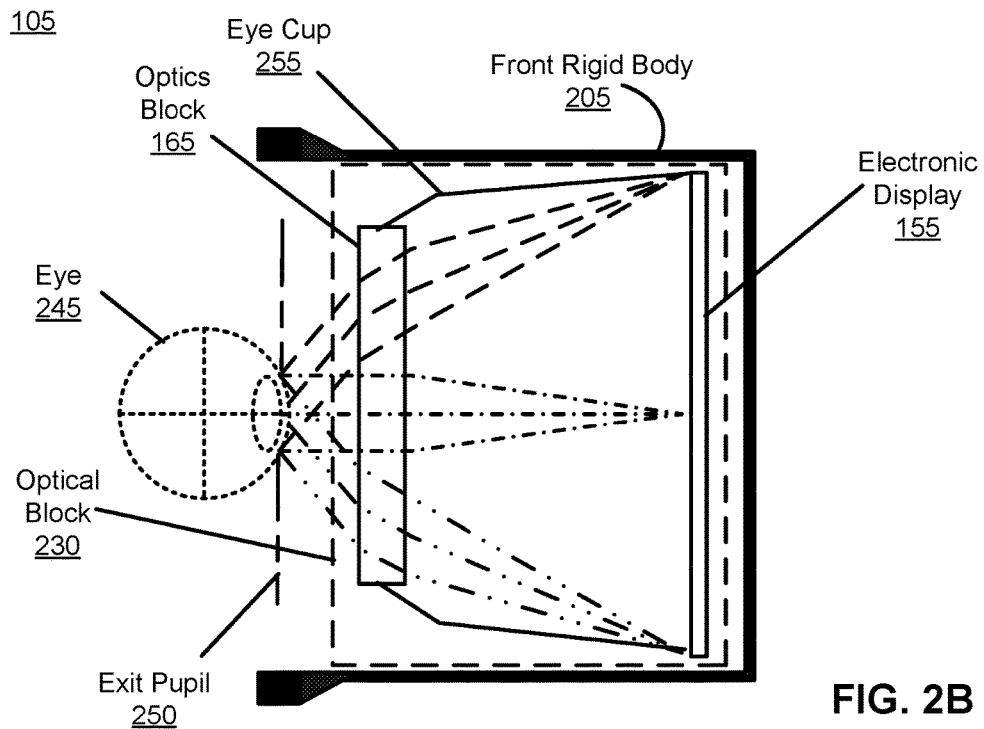
FIG. 2B shows a cross section of a front rigid body of the HMD in FIG. 2A, in accordance with some embodiments.

FIG. 2B shows a cross section of the front rigid body 205 of the HMD 105 shown in FIG. 2A. The front rigid body 205 includes an optical block 230 that provides altered image light to an exit pupil 250. The exit pupil 250 is the location in the front rigid body 205 where a user's eye 245 is positioned. For purposes of illustration, FIG. 2B shows a cross section associated with a single eye 245, but the HMD 105 may include another optical block that provides altered image light to another eye of the user.

The optical block 230 includes the electronic display 155, the optics block 165, and an eye cup 255. The eye cup 255 is mechanically secured with the front rigid body 205, and holds the optics block 165. The electronic display 155 emits image light toward the optics block 165. The optics block 165 magnifies the image light, and in some embodiments, also corrects for one or more additional optical errors (e.g., distortion, astigmatism, etc.). The optics block 165 directs the image light to the exit pupil 250 for presentation to the user. In some embodiments, the optics block 165 and the eye cone 255 may be omitted from the optical block 230.

Figure 3:
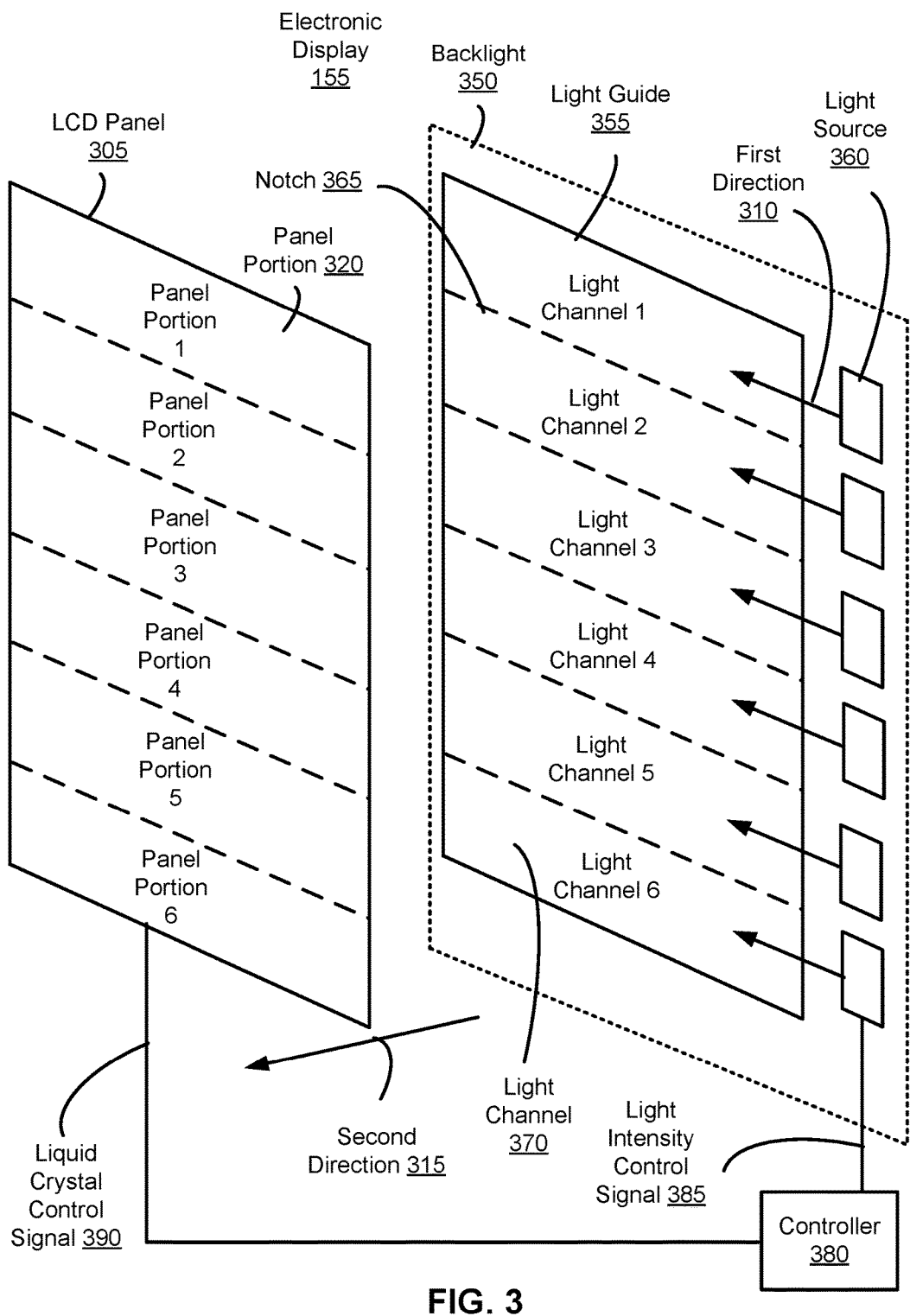
FIG. 3 is an exploded view of an example electronic display including a backlight with a channel cut light guide, in accordance with some embodiments.

FIG. 3 is a schematic exploded view of an electronic display 155 including a backlight 350 with a channel cut light guide 355 (also referred to as "light guide 355"), in accordance with some embodiments. The electronic display 155 includes a LCD panel 305, a backlight 350, and a controller 380. The LCD panel 305 includes a liquid crystal layer. The backlight 350 includes the light guide 355 and light sources 360. The controller 380 controls the setting of liquid crystals of the LCD panel 305 by providing a liquid crystal control signal 390 to the LCD panel 305. The controller 380 also controls the switching on and off of the light sources 360 by providing a light intensity control signal 385. The controller 380 coordinates the timing of selective LC setting and light source activation.

The light sources 360, which may be an array of LEDs arranged along a side surface of the light guide 355, emit light in a first direction 310 into an array of light channels 370 of the light guide 355. The light channels of the light guide 355 direct the light propagating in the first direction 310 in a second direction 315 from the top surface of the light guide 355 toward the LCD panel 305 to illuminate pixels of the liquid crystal layer.

The channel cut light guide 355 includes an array of light channels 370 that are defined between notches 365 on the bottom surface (opposite the top surface) of a light guide 355. The light guide 355 may be a single piece component, such as a Poly(methyl methacrylate) (PMMA) panel. The notches 365 provide light segmentation by substantially confining light emitted into each light channel within the light channel as the light propagates along the light channels in the first direction 310 along the width of the light channels, with small amounts of light leakage to adjacent light channels. The notches 365 prevents light leakage to more distant (e.g., non-adjacent) light channels. For example, light emitted from a lighting source 360 into the light channel 3 leaks into adjacent light channel 2 and adjacent light channel 4, but does not leak into the non-adjacent light channels 1, 5, and 6.

In the example shown in FIG. 3, the light guide 350 is segmented into light channels 1 through 6. Each light channel 1 through 6 is aligned behind a respective panel portion 1 through 6 of the LCD panel 305 to emit light toward the respective panel portion 1 through 6 in the second direction 315. Although the light guide 355 in FIG. 3 includes six light channels 370, in other examples, the light guide 355 can include a different number of light channels 370.

Each light source 360 can be controlled individually by its own light source driver to enable selective illumination of the panel portions 1 through 6. Each light channel 370 can be optically coupled with one or more light sources 360 that emit light into the light channel. In some embodiments, multiple separately controllable color LEDs (e.g., a red, green, and blue color LED) emit light into each light channel 370. The intensity (e.g. over time) of light from a light source 430 is adjusted according to the light intensity control signal 385 from the controller 380. In various embodiments, light sources 360 may be coupled to one or more side surfaces of the light guide 355. Examples of a light source 370 include a light bulb, a light emitting diode, or any component that is capable of emitting light.

The LCD panel 305 includes pixels formed by liquid crystals that control an amount of light passing through the liquid crystal layer from the backlight 350. States of liquid crystals can be programmed and controlled according to the liquid crystal control signal 390 generated by the controller 380, such as based on image data transmitted from the VR engine 145. Although the LCD panel 305 in FIG. 3 is segmented into six panel portions 320, in other examples, the LCD panel 305 can include a different number of panel portions 320. For example, the LCD panel 305 may include the same number of panel portions 320 as the number of light channels 370 of the light guide 355, with each light channel 370 emitting light to a corresponding panel portion 320.

Figure 4:
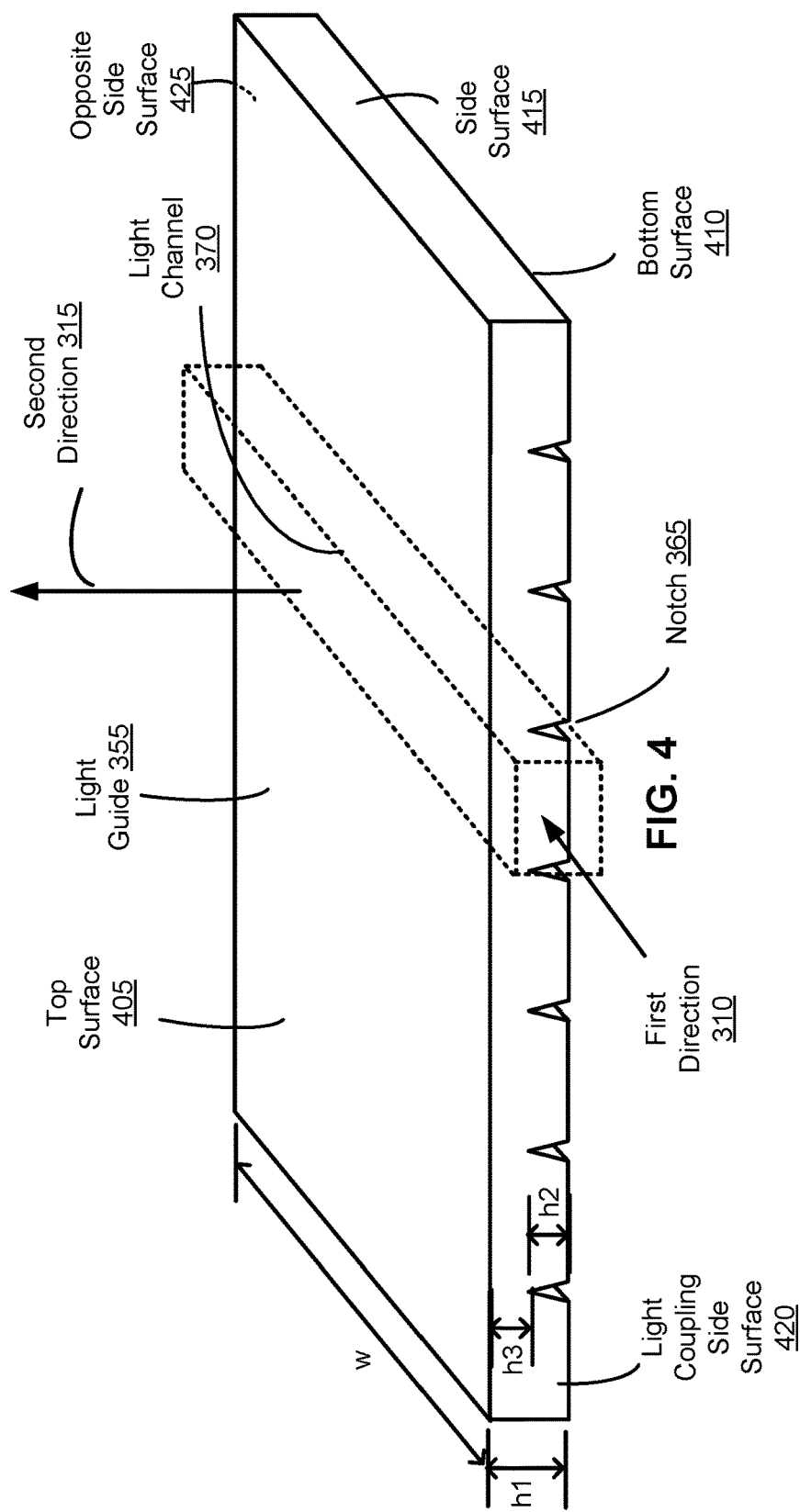
FIG. 4 is channel cut light guide, in accordance with some embodiments.

FIG. 4 shows a channel cut light guide 355, in accordance with some embodiments. The channel cut light guide 355 may be a Poly(methyl methacrylate) (PMMA) panel including a top surface 405, a bottom surface 410, and side surfaces 415 (including light coupling side surface 420 and opposite side surface 425) defined between the top surface 405 and bottom surface 410. The light guide 355 includes an array of light channels 370 defined by an array of notches 365 formed on the bottom surface 410 of the light guide 355.

The array of notches 365 are recessed regions on the bottom surface 410 of the light guide 355. The notches 365 may be formed during light guide fabrication, such as by using microstructure patterning to form the light channels 370 as protruding portions of light guide material. In another example, the notches 365 are cut or etched from a light guide having a flat bottom surface 410. The notches 365 may run from the light coupling side surface 420 along the width w of the light guide 355, such as to the opposite side surface 415. As such, the notches 365 define the light channels 370 from the light coupling side surface 420 along the width w of the light guide 355 to the opposite side surface 415. Placing the notches 365 on the bottom surface 410 rather than the top surface 405 provides efficient light extraction at the top surface 405 to the LCD panel.

The notches 365 do not fully separate the light channels 370 into separate components. For example, the side surfaces 415 of the light guide 355 have a height h1, and the notches 365 have a height h2 that is less than the h1. The heights h1 and h2 define a channel connection region height h3 for the light channels 370. In some embodiments, the height h2 of the notches 365 may be between 10 percent to 90 percent the height h1, and the height h3 is correspondingly between 90 percent to 10 percent the height of h1. The height of h2 may be chosen based on the desired strength of segmentation, or desired smoothness of segmented border transitions. For example, deeper notches may result in improved segmentation, but reduced smoothness at borders. In some embodiments, the height h2 is 50% the height h1.

In some embodiments, the height h1 of the light guide 355 changes along the width w. For example, the height h1 may be larger toward the light coupling side surface 420 near the lighting sources, and smaller toward the opposite side surface 425, to provide uniform light extraction in the second direction 315 along the width w of the light guide 355. In some embodiments, the height h2 changes based on changes to the height h1 along the width w. In one example, a consistent ratio of h1 and h2 is maintained along the width w. In another example, a consistent channel connection region height h3 is maintained along the width w, where h1 and h2 change along the width w.

In some embodiments, the notches 365 are air gaps that separate portions of adjacent light channels 370, and provide for internal reflection of light within the light guide at the surface of the notches 365. In some embodiments, the notches 365 are filled with other materials, such as dielectric coatings, or other components to prevent light generated by a backlight unit from traversing or leaking to another adjacent light channel at the notches 365. Backlight elements, such as brightness enhancing films, diffusers, reflectors, may or may not be shared between the light channels 370.

An array of light sources 360 (as shown in FIG. 3) are arranged along the light coupling side surface 420 to emit light to the light coupling side surface 415 and into the light channels in the first direction 310. The light channels direct the light propagating in the first direction 310 along the width w of the light channels in the second direction 315, from the top surface 405 toward the LCD panel. In some embodiments, an array of light sources 360 are arranged along one or more other side surfaces, such as the opposite side surface 425. Here, light sources emit light from both the light coupling side surface 420 and the opposite side surface 425 into the light channels 370, and the light channels 370 directs the light in the second direction 315 toward the LCD panel.

Figure 5:
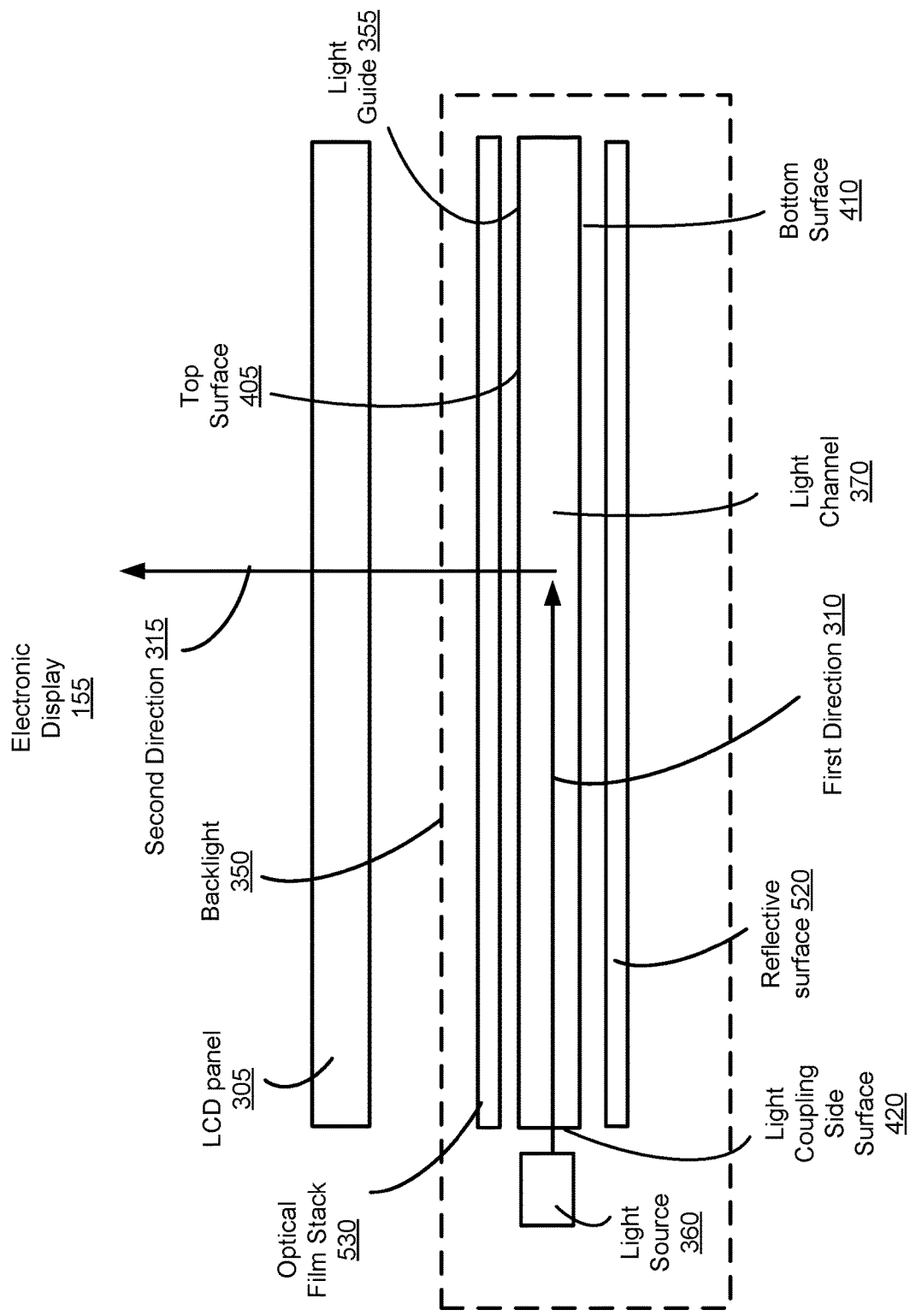
FIG. 5 shows a cross sectional side view of an electronic display, in accordance with some embodiments.

FIG. 5 shows a cross sectional side view of the electronic display 155, in accordance with some embodiments. The backlight 350 further includes a reflective surface 520, and an optical film stack 530. The optical film stack 530 may be disposed between the light guide 355 and the LCD panel 305. The optical film stack 530 may include a diffuser that facilitates the uniform distribution of light from the light guide 355 across the pixels of the LCD panel 305. The optical film stack 530 may additionally or alternatively include a reflective polarizer film that reflects unpolarized light back toward the LCD panel 305 that would otherwise be absorbed. The optical film stack 530 may also include brightness enhancement films (BEFs) that control the intensity as a function of angle and recycle light through the system.

The light guide 355 directs light towards the top surface 405 and the bottom surface 410, where the top surface 405 faces the LCD panel 410 and the bottom surface 410 faces the reflective surface 520. The reflective surface 520 includes an optical mirror that reflects light directed from the bottom surface 410 of the light guide 355 towards the LCD panel 305. The notches 365 defined on the bottom surface 410 reduces light emission from the bottom surface 410, improving the efficiency of light emission at the top surface 405.

Figure 6B:
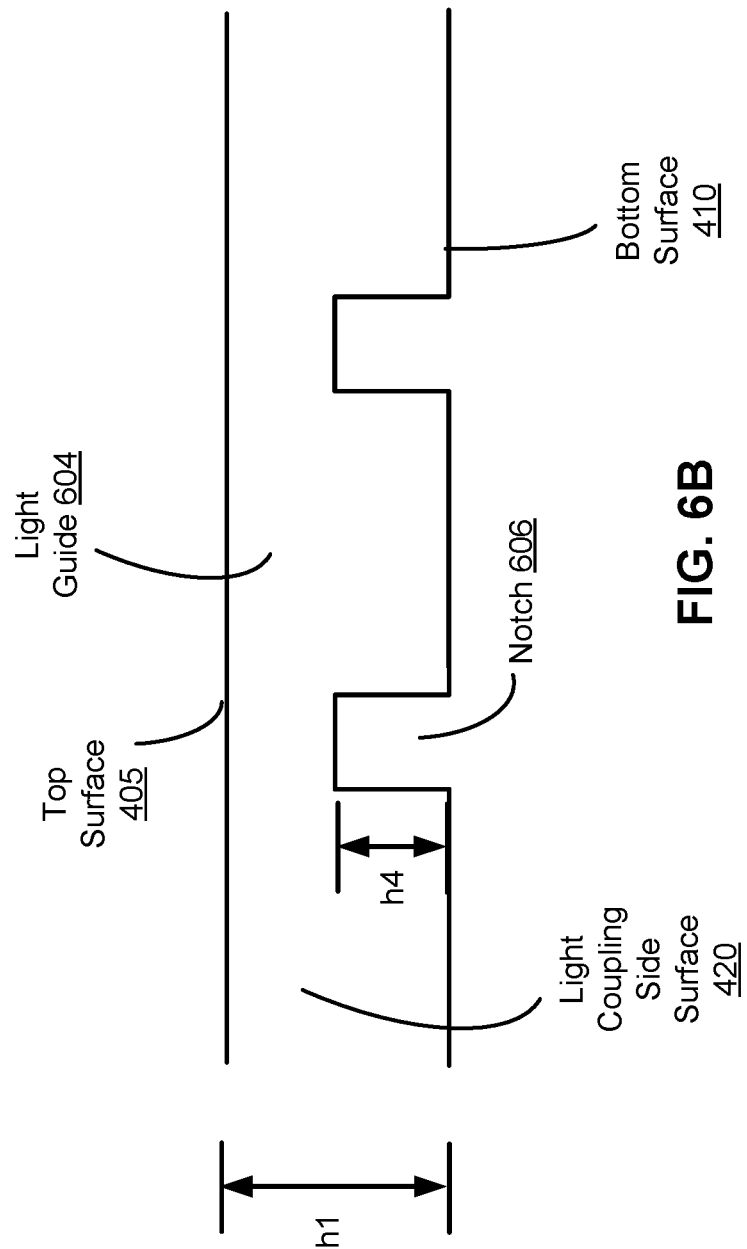

FIGS. 6A and 6B show examples of channel cut light guides, in accordance with some embodiments. In FIG. 6A, the light guide 355 includes notches 602 defined by recess on the bottom surface 410 having triangular shaped cross sections. The triangular shape of the cross section is defined along the light coupling side surface 420 between the top surface 405 and the bottom surface 410. Notches may include various cross sectional shapes suitable for isolating light channels. For example, the angle θ of the triangular shaped cross section of the notches may vary depending on the amount of desired light channel segmentation. In some embodiments, the angle θ of a notch can vary along the width w (as shown in FIG. 4). For example, the angle θ may increase closer to the light sources 360 (e.g., along the width w shown in FIG. 4) to provide stronger light segmentation for portions of the light guide receiving higher light intensities from the light sources 360. In FIG. 6B, the light guide 604 includes notches 606 having rectangular shaped cross sections. The height h4 of the rectangular shaped notches 606 may be between 10 percent to 90 percent the height h1 of the side surface of the light guide 604.

FIG. 7A shows a channel cut light guide 702 including light extraction features 706, in accordance with some embodiments. The light extraction features 706 are defined on the surface of the notches 704. The light extraction features 706 include series of unevenly spaced, round dimples that diffuse propagating light. The density of the light extraction features increase with distance to the light sources 360 (e.g., along the width w shown in FIG. 4) according to a diffusion equation. The dimples may be defined by recessed portions of the surface of the notches 704. The light extraction features 706 may be biased toward vertical light extraction at the top surface 405 of the light guide 702 (e.g., on the opposite side of the light guide 702 from the notches 704 and light extraction features 706).

In some embodiments, light extraction features may be additionally disposed on the top surface 405 and/or the bottom surface 410 on the light channels of the light guide 702 between the notches 704.

FIG. 7B shows a channel cut light guide 752 including pyramidal light extraction features 756, in accordance with some embodiments. Light extraction features on the surface of a notch can include different shapes. For example, the light extraction features 756 include series of unevenly spaced, pyramidal dimples that diffuse propagating light. The pyramidal dimples are recessed portions of the surface of the notches 754 defined on the bottom surface 460 to enhance vertical light extraction at the top surface 455. The discussion above regarding the placement, density, and directional light extraction enhancement control for the round light extraction features 706 may be applicable to the pyramidal light extraction features 756.

FIG. 8 is a timing diagram of signals applied to the example electronic display, in accordance with some embodiments. The controller 380 applies the liquid crystal control signal 390 including signals or pulses 810A, 810B, 820A, 820B . . . 860A, 860B (often called "data voltages") to LCD panel 305, and the light intensity control signal 385 including signals or pulses 810C, 820C . . . 860C to the backlight 350 for displaying an image for a time frame 400 (e.g., 11 ms).

In one embodiment, (i) programming and transitioning of states of liquid crystals in a panel portion 320 of the LCD panel 305 and (ii) illuminating a corresponding light channel 370 of the backlight 350 can occur in an alternating sequence. Specifically, a pulse 810A is provided to the panel portion 1 to program the panel portion 1 during a time period T1. After the panel portion 1 is programmed, a pulse 810B is provided to the panel portion 1 to transition states of liquid crystals in the panel portion 1 during a time period T2. After transitioning states of the liquid crystals in the panel portion 1, a pulse 810C is provided to the lighting sources of the light channel 1 to illuminate the light channel 1 during a time period T3.

While the states of the liquid crystals in the panel portion 1 are transitioned, a pulse 820A is provided to the panel portion 2 to program the panel portion 2 during the time period T2. In addition, a pulse 820B is provided to the panel portion 2 to transition states of liquid crystals in the panel portion 2 during the time period T3, while the light channel 1 illuminates light. After states of the liquid crystals in the panel portion 2 are transitioned, a pulse 820C is provided to the light channel 2 to illuminate the light channel 2 during a time period T4.

For a last panel portion and light channel (e.g., panel portion 6 and light channel 6), a pulse 860A of the time frame 400 is provided to the last panel portion (e.g., panel portion 6) to program the last panel portion during a last time period TN of the time frame 800. A pulse 860B of the time frame 400 is provided to the last panel portion to transition states of liquid crystals in the last panel portion, while the pulse 810A of the next time frame 400 is provided to the panel portion 1 to program the panel portion 1 during a time period T1 of the next time frame 400. In addition, a pulse 860C of the time frame is provided to the last light channel (e.g., light channel 6) to illuminate the last light channel, while the pulse 810B of the next time frame 400 is provided to the panel portion 1 to transition states of liquid crystals in the panel portion 1 during a time period T2 of the next time frame 400. Accordingly, a portion of an image corresponding to the last panel portion and last light channel is displayed, while the first panel portion 1 is programmed.

In another embodiment, state transitions occur automatically after programming, thus pulses 810B, 820B . . . 860B for transitioning states of liquid crystals may be omitted. In this embodiment, time periods for programming liquid crystals and transitioning states of the liquid crystals can be combined into a single time period.

Advantageously, by segmenting the LCD panel 305 and the backlight 350 as shown in FIG. 8, and displaying an image as shown in FIG. 3, latency involved for programming a portion of the liquid crystal layer and illuminating light can be reduced. Accordingly, high quality images (e.g., 1080 by 720 pixels or higher) can be presented to the user in response to the user motion without a noticeable lag to provide a seamless VR/AR experience to the user.

In some embodiments, pixels of the LCD panel that are adjacent or near a particular panel portion are programmed and transitioned with the panel portion. As discussed above, a light channel of the light guide allows some leakage of light into adjacent light channels, which are directed toward the pixels of the LCD panel that are adjacent or near a panel portion to be illuminated by the light channel. Thus pixels that are near an illuminated panel portion may be set with the pixels of the panel portion. For example, the pulse 810A is provided to the panel portion 1 to program the panel portion 1 during a time period T1, and to pixels of at least a portion of adjacent panel portions (e.g., panel portion 2). After the panel portion 1 and nearby pixels are programmed, a pulse 810B is provided to the panel portion 1 and nearby pixels to transition states of liquid crystals in the panel portion 1 and nearby pixels during the time period T2. After transitioning states of the liquid crystals in the panel portion 1 and nearby pixels, the pulse 810C is provided to the lighting sources of the light channel 1 to illuminate the light channel 1 during a time period T3. The panel portion 1 and the nearby pixels are thus illuminated during the time period T3. Here, each illuminated pixel is set and/or has completed state changes prior to illumination. The other panel portions and light channels may be controlled in a similar fashion to compensate for light leakage across adjacent light channels.

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A liquid crystal display (LCD) device, comprising:
  a LCD panel including a first panel portion and a second panel portion adjacent to the first panel portion;
  a backlight for illuminating the LCD panel, including:
    a light guide including a top surface, a bottom surface, and a side surface, the light guide including an array of notches on the bottom surface to define an array of light channels along the side surface, the array of light channels including a first light channel and a second light channel adjacent to the first light channel; and
    light emitting diodes (LEDs) disposed along the side surface of the light guide to emit light in a first direction into the array of light channels of the light guide, the first light channel receiving first light from a first LED and directing the first light in a second direction from the top surface of the light guide toward the first panel portion of the LCD panel, the second light channel receiving second light from a second LED and directing the second light in the second direction from the top surface of the light guide toward the second panel portion of the LCD panel; and
  a controller configured to:
    in a first time period, program the first panel portion;
    in a second time period subsequent to the first time period, program the second panel portion while liquid crystals in the first panel portion transition states;
    in a third time period subsequent to the second time period, control the first LED to emit the first light into the first light channel and toward the first panel portion while liquid crystals in the second panel portion transition states; and
    in a fourth time period subsequent to the third time period, control the second LED to emit the second light into the second light channel and toward the second panel portion.

2. The LCD device of claim 1, wherein each of the notches is a recessed region on the bottom surface of the light guide, each recessed region having a triangular shaped cross section that separates two adjacent light channels.

3. The LCD device of claim 2, wherein the triangular shaped cross section of the recessed regions each defines an angle that decreases in the first direction.

4. The LCD of claim 1, wherein each of the notches is a recessed region on the bottom surface of the light guide, each recessed region having a rectangular shaped cross section that separates two adjacent light channels.

5. The LCD device of claim 1, wherein the array of notches define channel connection regions of the light guide between the light channels, the channel connection regions having a thickness between 10 percent and 90 percent of a height of the light guide defined between the top surface and the bottom surface.

6. The LCD device of claim 1, wherein the light guide includes light extraction features defined by recessed portions on a surface of a notch of the array of notches.

7. The LCD device of claim 6, wherein a density of the light extraction features increases in the first direction.

8. The LCD device of claim 1, wherein the array of notches confine light leakage from a first light channel to two adjacent light channels of the first light channel.

9. The LCD device of claim 1, wherein the light guide has a variable height along the first direction.

10. The LCD device of claim 1, wherein each of the notches has a height that is variable along the first direction.

11. The LCD device of claim 10, wherein the array of notches define channel connection regions of the light guide between the light channels, and each of the channel connection regions has a consistent height along the first direction.

12. The LCD device of claim 1, wherein the notches include a dielectric coating.

13. A head-mounted display (HMD), comprising:
  a liquid crystal display (LCD) device, comprising:
    a LCD panel including a first panel portion and a second panel portion adjacent to the first panel portion;
    a backlight for illuminating the LCD panel, including:
      a light guide including a top surface, a bottom surface, and a side surface, the light guide including an array of notches on the bottom surface to define an array of light channels along the side surface, the array of light channels including a first light channel and a second light channel adjacent to the second light channel; and
      light emitting diodes (LEDs) disposed along the side surface of the light guide to emit light in a first direction into the array of light channels of the light guide, the first light channel receiving first light from a first LED and directing the first light in a second direction from the top surface of the light guide toward the LCD panel, the second light channel receiving second light from a second LED and directing the second light in the second direction from the top surface of the light guide toward the second panel portion of the LCD panel; and
    a controller configured to:
      in a first time period, program the first panel portion;
      in a second time period subsequent to the first time period, program the second panel portion while liquid crystals in the first panel portion transition states;
      in a third time period subsequent to the second time period, control the first LED to emit the first light into the first light channel and toward the first panel portion while liquid crystals in the second panel portion transition states; and in a fourth time period subsequent to the third time period, control the second LED to emit the second light into the second light channel and toward the second panel portion.

14. The HMD of claim 13, wherein each of the notches is a recessed region on the bottom surface of the light guide, each recessed region having a triangular shaped cross section that separates two adjacent light channels.

15. The HMD of claim 13, wherein each of the notches is a recessed region on the bottom surface of the light guide, each recessed region having a rectangular shaped cross section that separates two adjacent light channels.

16. The HMD of claim 13, wherein the array of notches define channel connection regions of the light guide between the light channels, the channel connection regions having a thickness between 10 percent and 90 percent of a height of the light guide defined between the top surface and the bottom surface.

17. The HMD of claim 13, wherein the light guide includes light extraction features defined by recessed portions on a surface of a notch of the array of notches.

18. The HMD of claim 13, wherein the array of notches confine light leakage from a first light channel to two adjacent light channels of the first light channel.

19. A liquid crystal display (LCD) device, comprising:
a LCD panel including a first panel portion and a second panel portion adjacent to the first panel portion;
a backlight for illuminating the LCD panel, including:
a light guide including a top surface, a bottom surface, and a side surface, the light guide including an array of notches on the bottom surface to define an array of light channels along the side surface, the array of light channels including a first light channel and a second light channel adjacent to the first light channel; and
light emitting diodes (LEDs) disposed along the side surface of the light guide to emit light in a first direction into the array of light channels of the light guide, the first light channel receiving first light from a first LED and directing the first light in a second direction from the top surface of the light guide toward the first panel portion of the LCD panel, the second light channel receiving second light from a second LED and directing the second light in the second direction from the top surface of the light guide toward the second panel portion of the LCD panel; and
a controller configured to:
in a first time period, program the first panel portion and transition states of liquid crystals in the first panel portion; and
in a second time period subsequent to the first time period:
control the first LED to emit the first light into the first light channel and toward the first panel portion;
program the second panel portion; and
transition states of liquid crystals in the second panel portion; and
in a third time period subsequent to the second time period, control the second LED to emit the second light into the second light channel and toward the second panel portion.

* * * * *